United States Patent
Rao DV

(10) Patent No.: US 9,374,327 B2
(45) Date of Patent: Jun. 21, 2016

(54) INTELLIGENT CHAT SYSTEM

(71) Applicant: VMware, Inc., Palo Alto, CA (US)

(72) Inventor: Raja Rao DV, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 42 days.

(21) Appl. No.: 13/736,756

(22) Filed: Jan. 8, 2013

(65) Prior Publication Data

US 2014/0195621 A1 Jul. 10, 2014

(51) Int. Cl.
*G06F 15/16* (2006.01)
*H04L 12/58* (2006.01)
*H04L 12/18* (2006.01)

(52) U.S. Cl.
CPC ............ *H04L 51/02* (2013.01); *H04L 12/1827* (2013.01)

(58) Field of Classification Search
USPC .................................................. 709/206, 207
See application file for complete search history.

(56) References Cited

U.S. PATENT DOCUMENTS

| 2005/0198031 | A1* | 9/2005 | Pezaris | H04L 12/588 |
| 2008/0201425 | A1* | 8/2008 | Baker | G06Q 30/02 709/204 |
| 2010/0159883 | A1* | 6/2010 | Pascal | H04L 12/581 455/412.1 |
| 2012/0016678 | A1* | 1/2012 | Gruber | G06F 17/3087 704/275 |
| 2012/0245944 | A1* | 9/2012 | Gruber | G06F 17/3087 704/270.1 |

FOREIGN PATENT DOCUMENTS

| WO | WO 02101483 A2 | * 11/2002 |
| WO | WO 02101483 | * 12/2002 |

* cited by examiner

*Primary Examiner* — Vivek Srivastava
*Assistant Examiner* — Hermon Asres

(57) ABSTRACT

The disclosure herein describes an intelligent chat system. During operation, the system monitors content provided by participants of an online chat, and automatically obtains, from a data source, additional information based on the monitored content. The system then presents the obtained additional information to the chat participants without the need for the chat participants to request the additional information.

21 Claims, 6 Drawing Sheets

INTELLIGENT CHAT SYSTEM

BACKGROUND

Online chat enables real-time communications, usually in form of text or multi-media based messages, between two or more parties. Many tools, such as instant messengers, Internet Relay Chat (IRC), talkers, etc., are available for users to perform one-to-one chat or one-to-many group chat. Unlike other communication channels, such as emails or SMS messages, where the delay for visual access to the sent message often hampers the flow of communication, users of the various online chat systems can view the status (such as busy or away) of other users, and receive instant responses from the other users. This direct, bi- or multi-direction, and real-time nature of online chat applications make them preferred ways of communication among many people. Recently, an increasing number of corporate users are adopting online chatting as a preferred communication channel for business uses such as providing customer support. Nonetheless, most chat applications still remain only as a communication tool and do not take full advantage of the computing power available today.

SUMMARY

The disclosure herein describes an intelligent chat system. During operation, the system monitors content provided by participants of an online chat session, and automatically obtains, from a data source, additional information based on the monitored content. The system then presents the obtained additional information to the chat participants without requiring chat participants to request the additional information manually.

The system can optionally display the additional information within a chat window. The additional information can be a recommendation to the chat participants, and can include a map, an email, a date, a time, a calendar item, or a venue.

BRIEF DESCRIPTION OF FIGURES

In the figures, like reference numerals refer to the same figure elements.

DETAILED DESCRIPTION

Figure 1:
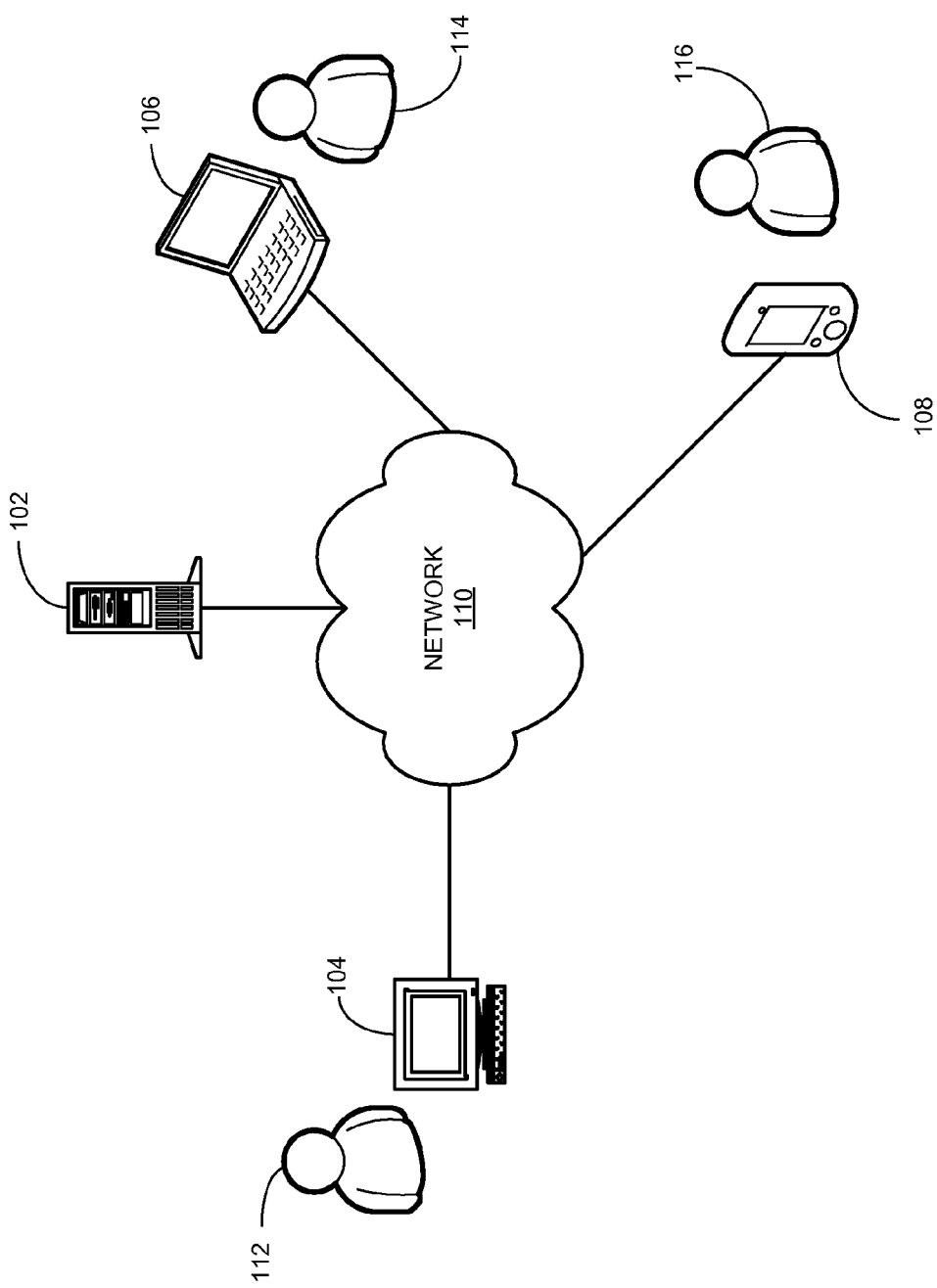
FIG. 1 presents a diagram illustrating an exemplary intelligent chat system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present disclosure describes an intelligent chat system that enhances a user's online chat experience by intelligently assisting the user on tasks other than the chat session. For example, the intelligent chat system provides an intelligent chat assistant that runs in the background, monitors the conversation, and provides assistance, such as calendar lookup and making recommendations, to the users based on the content of the conversation.

Many online chat tools, such as instant messengers, Internet Relay Chat (IRC), talkers, etc., provide ways for their users to communicate with each other as if the other person were present. Although most existing chat applications provide multi-media functionalities, such as allowing a user to share photos, audio, and video files, or to click a hyper link, these features still require the user to manually select the multi-media file or click on a link. It is desirable to provide some intelligence with a chat application, in addition to the basic communication function, that can enhance the user experience.

To achieve this goal, embodiments of the system described herein provide an intelligent chat assistant that monitors the chat content, extracts useful information from internal or external data sources based on the chat content, and presents that useful information to the chat participants. For example, during a chat session, a person A may ask a person B for directions to person B's home. In a conventional setting, person B either has to type a lengthy description in the chat window to give directions to his home, or he can type his home address inside the chat window and let person A search for directions. Either way, such an interaction can be time-consuming. With the intelligent chat system described herein, however, a chat assistant constantly monitors the chat content. The intelligent chat assistant can parse text entered by the users to extract meaningful keywords, such as address, directions, time, date, etc. Consequently, the intelligent chat assistant recognizes such a question, extracts the home address of person B, uses a mapping application (such as a web-based online map search service) to obtain a map showing the directions to person B's home, and presents the map inside the chat window. Compared with the conventional chat experience, such automatic response of the intelligent chat assistant enables more effective communications among chat participants.

FIG. 1 presents a diagram illustrating an exemplary intelligent chat system. In FIG. 1, an intelligent chat system 100 includes a chat server 102, a number of chat clients 104, 106, and 108, and a network 110.

Network 110 may correspond to any type of wired or wireless networks capable of coupling computing nodes (e.g., chat server 102 and chat clients 104-108). Such networks include, but are not limited to, a local area network (LAN), a wide area network (WAN), an enterprise's intranet, a virtual private network (VPN), and/or a combination of networks. In one or embodiment of the present system, network 110 includes the Internet. Network 110 may also include telephone and cellular networks, such as Global Systems for Mobile Communications (GSM) networks or Long Term Evolution (LTE) networks.

Chat server 102 provides online chat services to multiple client machines. In one embodiment, chat server 102 runs a chat server application that provides instant messaging (IM) services, which can be an Enterprise Instant Messaging (EIM) service or a Consumer Instant Messaging (CIM) service, or a combination of both. Various types of messaging protocols can be used by chat server 102, including, but not limited to: Instant Messaging and Presence Protocol (IMPP), Extensible Messaging Presence Protocol (XMPP), Advanced Message Queuing Protocol (AMQP), and various proprietary protocols.

Users, such as users 112, 114, and 116, can communicate with each other via chat client applications that run on machines, such as chat clients 104, 106, and 108, respectively. The chat clients can be any type of node on network 110 with computational capability and mechanisms for communicating across the network. For example, the chat clients can include, but are not limited to: a workstation, a personal computer (PC), a laptop computer, a tablet computer, a smartphone, and/or other electronic computing devices with network connectivity. Furthermore, a chat client may couple to network 110 using wired and/or wireless connections.

The intelligent chat assistant may be part of the chat client application or the chat server application. In one embodiment, the intelligent chat assistant is part of the chat client application, residing on a chat client machine. The intelligent chat assistant can also be a stand-alone application that is independent from and agnostic to the chat application. One function of the intelligent chat assistant is that it monitors the content of a chat session, and based on such content spontaneously obtain information outside the chat session to assist the chat participants. Examples of such chat assistance include, but are not limited to: accessing on behalf of a user the local resources, such as the user's emails, calendar, local files, or media library, obtaining from the Internet information to augment the chat content (such as maps, third party media files, user reviews, recommendations, reservation information, etc.), and make activity recommendations.

Figure 2:
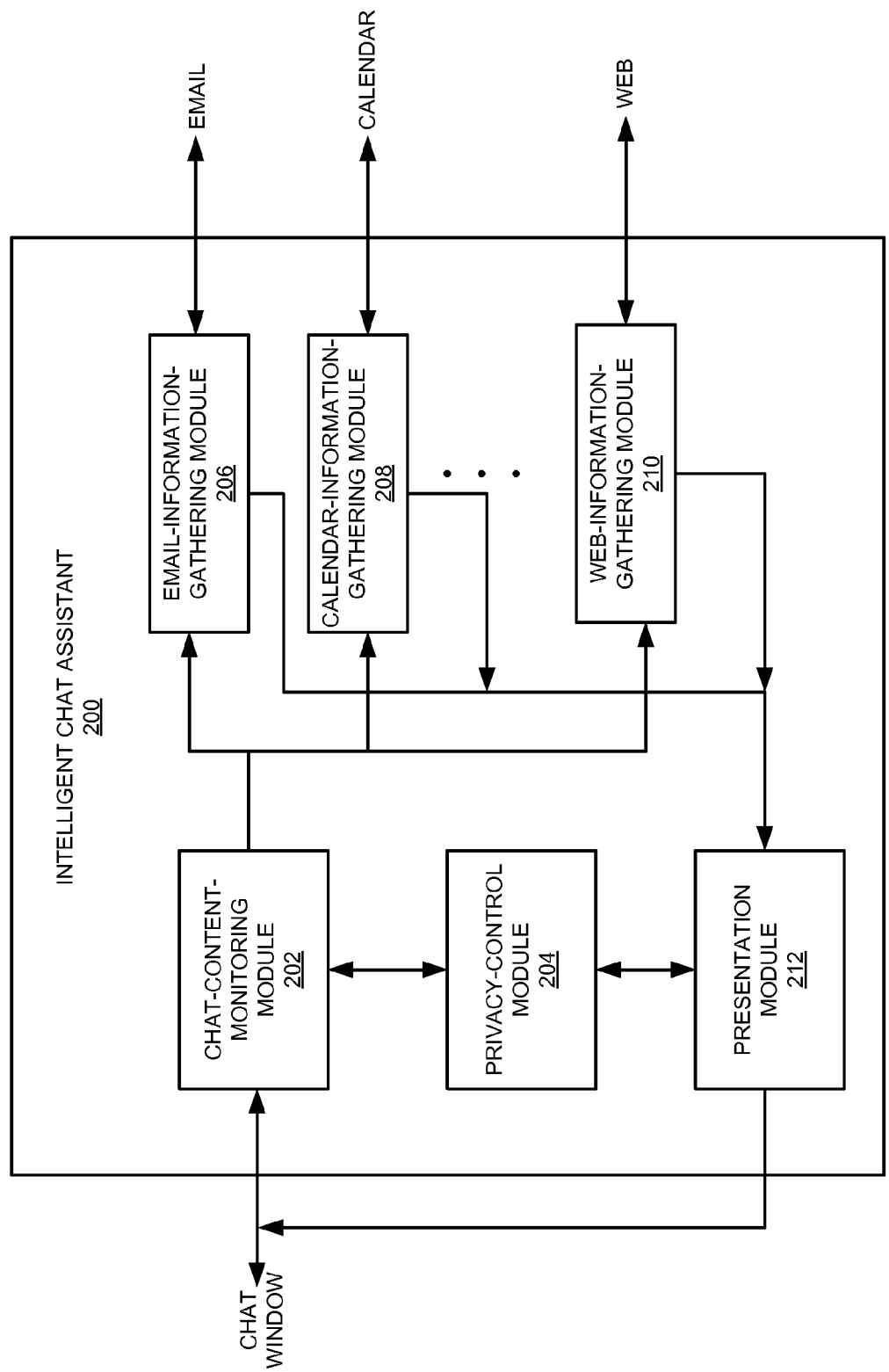
FIG. 2 presents a diagram illustrating an exemplary architecture of an intelligent chat assistant.

FIG. 2 presents a diagram illustrating an exemplary architecture of an intelligent chat assistant. In this example, an intelligent chat assistant 200 includes a chat-content-monitoring module 202, a privacy-control module 204, a number of information-gathering modules, such as an email-information-gathering module 206, a calendar-information-gathering module 208, and a web-information-gathering module 210, and a presentation module 212.

Chat-content-monitoring module 202 is responsible for monitoring the content of a conversation. For text-based chat, a language parser can be implemented to parse the text entered by chat participants within the chat window and infer meanings of the conversation. In one embodiment, the language parser is able to adapt to and learn the writing habits of the users, such as frequently used slang words or acronyms, over time. For audio- or video-based chat, a speech-recognition module is implemented to convert the spoken words into text, and then the language parser is used. Similarly, the speech-recognition module is able to adapt to and learn the user's speaking habits over time. In addition to monitoring the current ongoing conversation, chat-content-monitoring module 202 may also access locally or remotely cached historical data, such as previously saved conversations or previously established user behavior models, and infer meanings of the conversation using the historical data. Note that historical data is useful in inferring the meanings of phrases that may have multiple meanings.

Note that intelligent chat assistant 200 is able to access local and remote information that the user may want to keep private. For example, intelligent chat assistant 200 might be allowed obtain information from a user's login profile, such as gender, age, birth date, home address, etc. However, the user may want to control what type of information can be used by intelligent chat assistant 200 in assisting the conversation. Privacy-control module 204 is responsible for privacy control of personal information released to other chat participants by intelligent chat assistant 200. In the aforementioned example where a map showing directions to the user's home is automatically presented to chat participants, before using the user's home address to search for the map, privacy-control module 204 determines whether the user has previously authorized the other chat participants to know his home address and allows intelligent chat assistant 200 to use his home address with a third-party mapping service based on user-adjustable privacy settings. If so, the map will be displayed automatically; otherwise, intelligent chat assistant 200 is precluded from transmitting the user's home address to any third party. Various types of techniques can be used to control privacy. In one embodiment, privacy-control module 204 can use a rule-based system that allows a user to specify privacy rules. For example, a user may allow intelligent chat assistant 200 to show directions to his house to his real-life friends (such as relatives and colleagues), while preventing such information from being released to his virtual or online friends.

The information-gathering modules, such as email-information-gathering module 206, calendar-information-gathering module 208, and web-information-gathering module 210, are responsible for gathering information pertaining to the current conversation. Email-information-gathering module 206 interfaces with local or web-based email applications. In one embodiment, email-information-gathering module 206 can be configured to fetch and present one or more email messages based on the current conversation. For example, a user A has sent an email to a user B, who was busy and did not respond immediately. To remind user B about the email, user A may open a chat window and message user B "did you see my email?" This question is recognized by chat-content-monitoring module 202, and in response, email-information-gathering module 206 accesses a application programming interface (API) of the email application running on the local machine of user A, obtains the latest email from user A to user B, and displays the email inside the chat window. This way, instead of switching to his email window to look for the email, user B can view the email within the same chat window. In addition to pulling an email message that is related to the chat conversation, in some embodiments, email-information-gathering module 206 can also search the inbox of a person's email application in order to extract useful information that can enhance the chat conversation.

Calendar-information-gathering module 208 interfaces with the user's calendar (either a locally stored calendar or web-based one) to extract scheduling information. When a chat conversation is related to making appointments or scheduling meetings, this scheduling information can be automatically presented to chat participants. In one embodiment, with appropriate authorization, calendar-information-gathering module 208 can be configured to access multiple users' calendars and make recommendations for meeting times and/or locations based on information from all available calendars. For example, during a group chat, users A, B, and C may want to schedule a face-to-face meeting in the coming week. In a conventional setting, each user would need to manually report his available time slots, and all the users collectively determine a time slot that suits everyone. Such a process can be time-consuming and cumbersome to users. However, in embodiments of the present invention, this scheduling task can be automatically performed by intelligent chat assistant 200. More specifically, during the chat, chat-content-monitoring module 202 recognizes the request to schedule a meeting among users A, B, and C, and, in response, calendar-information-gathering module 208 accesses the calendars of all three users. In one embodiment, calendar-information-gathering module 208 compares the three calendars and selects time slots when everyone is free. Intelligent chat assistant 200 then presents the selected time slots to all users to allow them to make a final decision.

Web-information-gathering module 210 interfaces with various web-search engines, such as Google Search, in order to obtain external Internet-based information that can be used to enhance the chatting experience of users. For example, during a conversation at the lunch hour, a user A may ask his colleague user B whether he is interested in going to lunch together. Chat-content-monitoring module 202 recognizes the request, and in response, web-information-gathering module 210 searches the web, via a web-search engine, for restaurants near the office. The search results can be presented in the chat window as clickable links. Users A and B can then discuss their options based on the search results.

In one embodiment, web-information-gathering module 210 is also configured to filter the search results based on various criteria, such as current context as well as historical data. For example, instead of displaying all restaurants, the system may display only those restaurants that have been visited frequently by users A and B, or the system may display only those restaurants that have favorable user rating. In a further embodiment, web-information-gathering module 210 may interface with various web-based applications, such as Google Places or Yelp, to make recommendations to users. In addition, web-information-gathering module 210 can be configured to update the gathered information based on the updated chat content. In the previous lunch example, if user B responded that he would like to eat Japanese food for lunch, web-information-gathering module 210 will then update its search to limit the search to Japanese restaurants only.

In addition to these three information-gathering modules, other modules capable of accessing and searching local or remote data resources can also be included as part of intelligent chat assistant 200. For example, a database-search module can be included to search a particular database in order to extract information pertaining to the chat. This type of module can be particularly useful in a customer service setting. During a chat session between a customer service representative and a customer, the customer may ask a question regarding his monthly phone bill. In a conventional setting, the customer service representative asks the customer his account number, and then opens a separate window to access the database storing the customer's account information. In embodiments of the present system, intelligent chat assistant 200 monitors the conversation, observes the account number, and then searches the database using the account number and automatically displays the account information within the chat window. Similarly, if a customer is inquiring about a particular product, intelligent chat assistant 200 can monitor the conversation, observe the product name, and then automatically pull out information associated with the product. This feature can significantly improve the efficiency and lower the error rate of customer service and as a result increase customer satisfaction level.

Presentation module 212 is responsible for presenting the information gathered by the various information-gathering modules to the chat participants. Presentation module 212 can present the gathered information within the same chat window, thus allowing the chat participants to view the gathered information without switching windows. In a further embodiment, presentation module 212 modifies the size and/or format of the gathered data to make it more suitable for displaying inside the chat window. For example, the resolution and size of a picture may be adjusted to fit in the chat window. Alternatively, presentation module 212 can present the gathered information in a separate window that is better tailored for the information displayed. For example, presentation module 212 may initiate a separate browser window that is larger than the chat window to display a map.

Figure 3A:
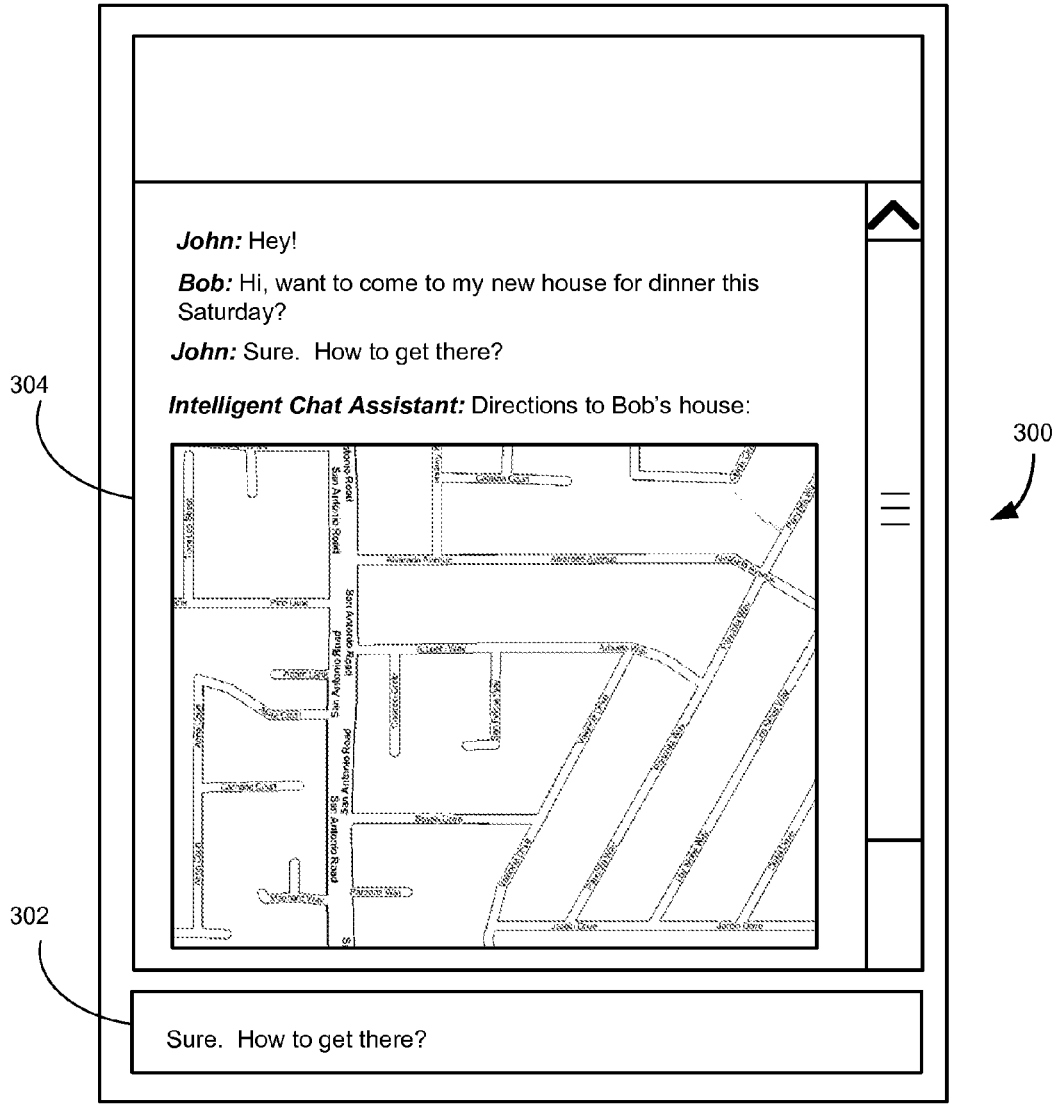
FIG. 3A presents an exemplary view of a user interface of a chat client application.

FIG. 3A presents an exemplary view of a user interface of a chat client application. When a user A is chatting with a user B, both of their client machines run a chat client application that displays a user interface 300. User interface 300 includes a text-input field 302 and a conversation-and-information display field 304. A user can type what he wants to say to another user inside text-input field 302. The input text strings will be displayed inside conversation-and-information display field 304 on both client machines, allowing both users to view the input text strings. Note that the intelligent chat assistant monitors content being displayed in conversation-and-information display field 304 in order to infer meanings of the conversation. In addition to displaying the conversation, conversation-and-information display field 304 also displays information pertaining to the conversation automatically provided by the intelligent chat assistant.

In the example shown in FIG. 3A, during the chat, Bob invites John to his home for dinner, and John asks directions to Bob's home. This entire conversation is displayed in conversation-and-information display field 304. In intelligent chat assistant 200 is running in the background and monitors the chat conversation. As soon as John asks for directions to Bob's house, intelligent chat assistant 200 retrieves Bob's home address from Bob's personal record (or from stored chat history) and issues a search to a third-party map service. Optionally, intelligent chat assistant 200 may also obtain John's home address from John's machine (by, for example, communicating with the intelligent chat assistant residing on John's machine) and perform a door-to-door driving direction search. As a result, conversation-and-information display field 304 displays a map showing the directions from John's home to Bob's home. Note that the map is automatically displayed by intelligent chat assistant 200 without requiring either Bob or John to open a map application. In a further embodiment, other additional information, such as traffic, weather, etc., regarding their dinner appointment may also be displayed by the intelligent chat assistant.

Figure 3B:
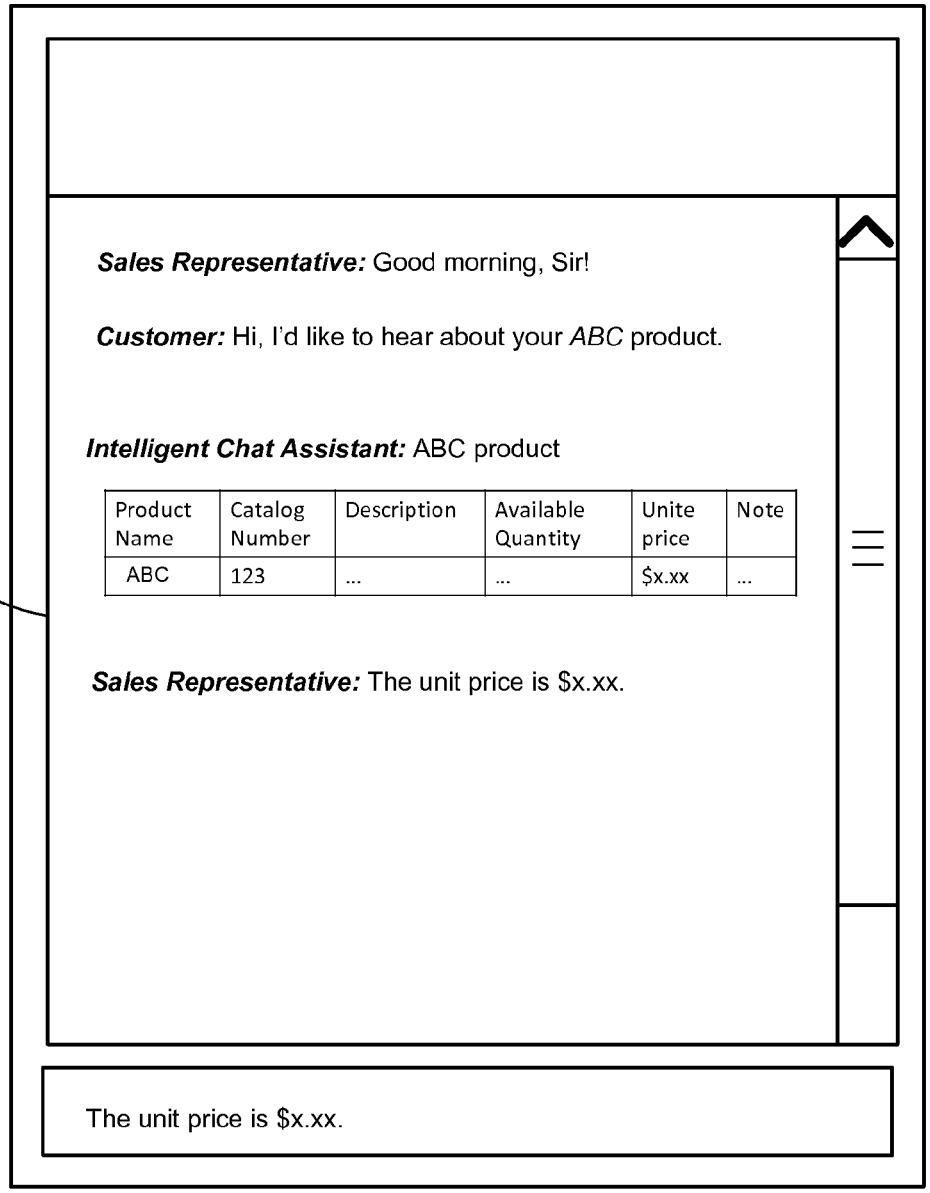
FIG. 3B presents a diagram illustrating an exemplary view of a user interface of a chat client application.

FIG. 3B presents an exemplary view of a user interface of a chat client application. In the example shown in FIG. 3B, during a chat session between a sales representative and a customer, the customer inquires about a particular product ABC. Upon detecting the customer's question, intelligent chat assistant 200 retrieves from the corporate database the product information of ABC and displays this information Instead of requiring the sales representative to search a database for the product information, the intelligent chat assistant running on the machine of the sales representative retrieves such information and displays the result in conversation-and-information display field 304. Note that intelligent chat assistant 200 may have a privacy-control setting that precludes some of the product information, such as available quantity, from being displayed to the customer. In other words, the user interface of the chat client application running on the customer's machine might only show part of the product information retrieved by the intelligent chat assistant on the sales representative side. In general, a privacy-control policy may cause the information displayed locally to the user to be different from the information displayed to a remote chat participant.

In the examples shown in FIGS. 3A and 3B, intelligent chat assistant 200 presents the additional information within the same display window where the chat conversation is displayed. Other configurations are also possible. For example, it is possible to display information provided by intelligent chat assistant 200 in a side panel, or in a separate window.

Figure 4:
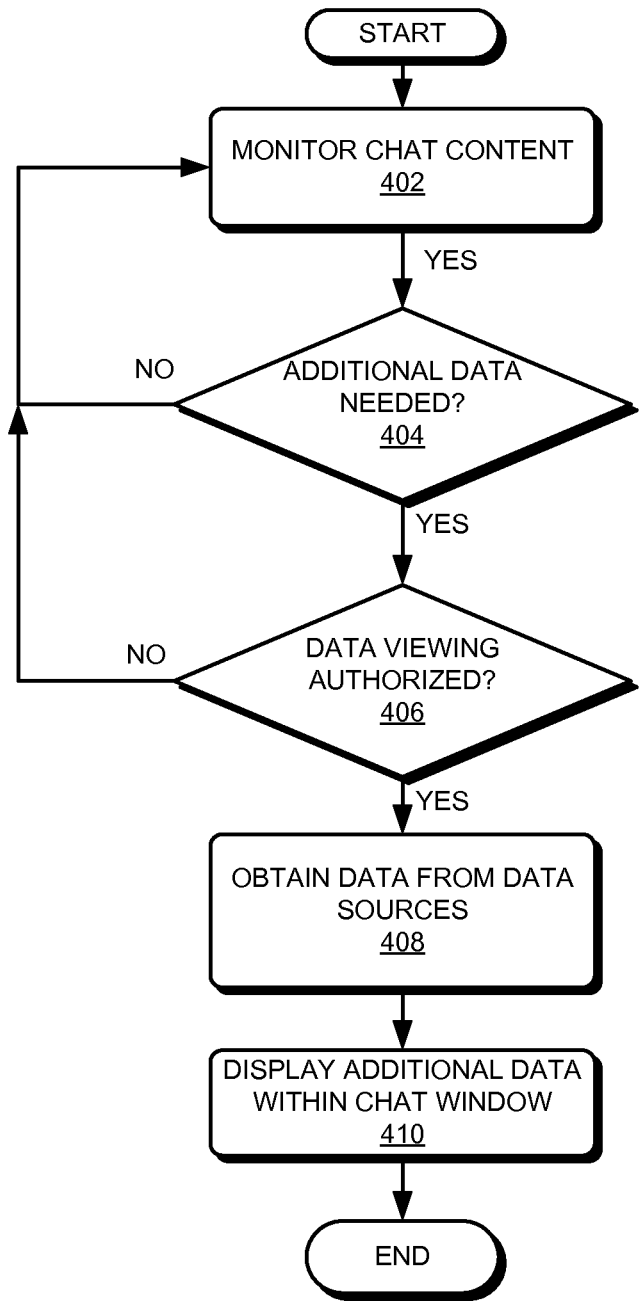
FIG. 4 presents a flowchart illustrating an exemplary process of assisting a chat session by an intelligent chat system.

FIG. 4 presents a flowchart illustrating an exemplary process of assisting a chat session by an intelligent chat system. During operation, intelligent chat assistant 200 monitors content of a chat conversation (operation 402), and determines whether additional data can be used to enhance the conversation based on the monitored content (operation 404). For example, if the conversation is related to finding driving directions, the system may determine that map data is needed. Similarly, if the conversation is related to scheduling a meeting, the system may determine that calendar data is needed. Various natural language parsing techniques can be used to infer meanings of the chat content. Additionally, historical data can also be used to assist in inferring meanings of the chat content. In one embodiment, intelligent chat assistant 200 can also use a database of rules to determine whether certain chat content can trigger the retrieval of additional data. If additional data is not needed, intelligent chat assistant 200 continues to monitor the chat content.

If additional data is needed, intelligent chat assistant 200 determines whether the chat participants (local, remote, or both) are authorized to view the additional data (operation 406). If not, the system continues to monitor the chat content. If at least one chat participant is authorized to view the additional data, intelligent chat assistant 200 automatically obtains the additional data from various local or remote data sources (operation 408). The data sources include, but are not limited to: emails, calendars, enterprise databases, and the Internet. Intelligent chat assistant 200 then displays the data within the chat window without the need for the chat participants to explicitly request that data (operation 410). The presented data enhances the experience of the chat participants, making it possible for the chat participants to exchange a large amount of information in a short time period.

Figure 5:
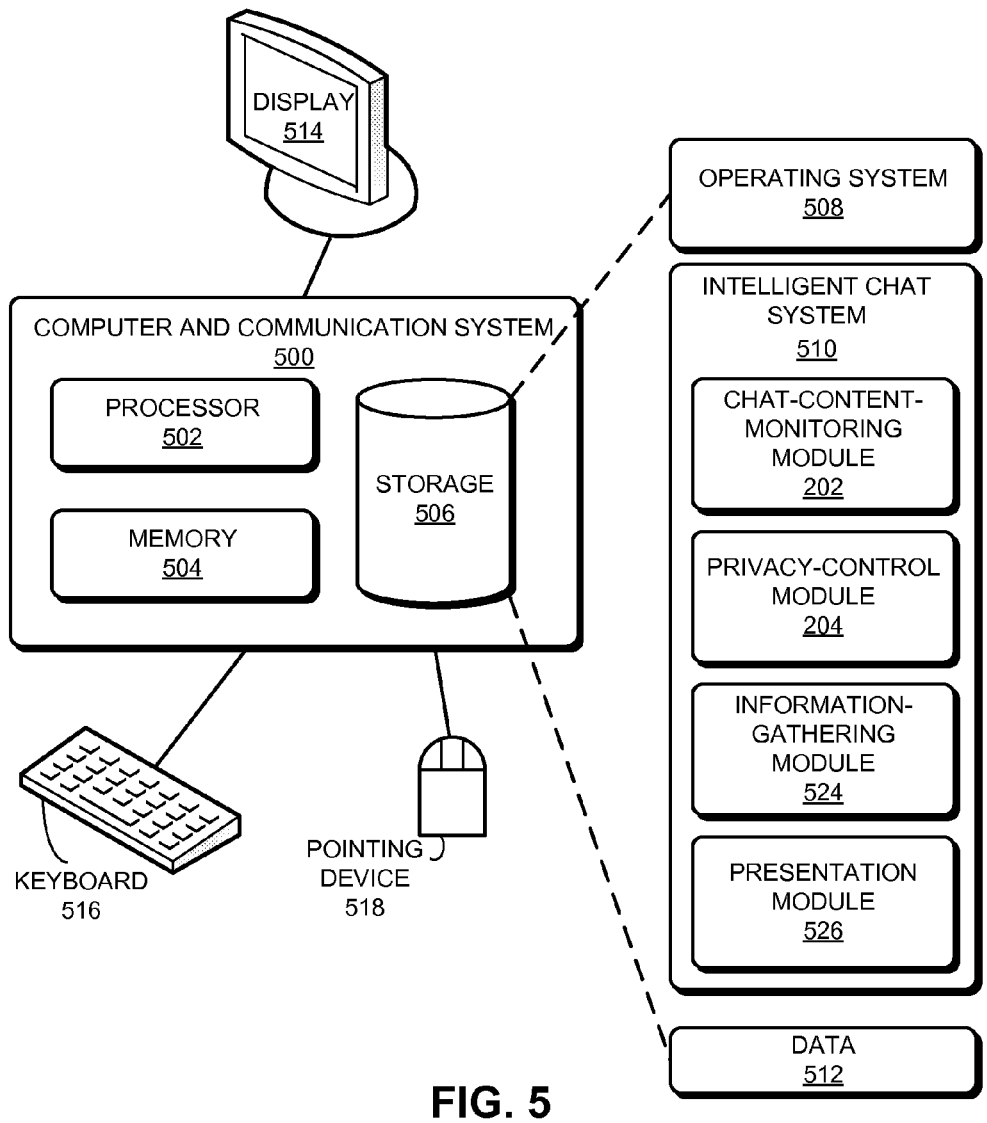
FIG. 5 illustrates an exemplary computer system for facilitating an intelligent chat system.

FIG. 5 illustrates an exemplary computer system for facilitating an intelligent chat system. In this example, a computer and communication system 500 includes a processor 502, a memory device 504, and a storage device 506. Memory 504 can include volatile memory (e.g., RAM). Furthermore, computer system 500 can be coupled to a display device 514, a keyboard 516, and a pointing device 518. Storage device 506 can store an operating system 508, an intelligent chat system 510, and additional data 512.

Intelligent chat system 510 can include instructions, which when loaded into memory 504 and executed by processor 502 can cause computer system 500 to perform methods and/or processes described in this disclosure. Specifically, intelligent chat system 510 may include instructions for monitoring chat content (chat-content-monitoring module 202). Further, intelligent chat system 510 can include instructions for controlling data privacy (privacy-control module 204). Intelligent chat system 510 can also include instructions for gathering information (information-gathering module 524) and instructions for presenting the gathered information (presentation module 526).

Additional data 512 can include any data as input or generated as output by the methods and/or processes described in this disclosure. Specifically, data 512 can store chat history or archives among chat participants and the additional information gathered by information-gathering module 524. Data 512 may also include privacy settings associated with chat participants.

Note that, although this disclosure uses an instant messaging system as an example, the scope of the present invention is not limited to the instant messaging system. Other online chat systems may be used including, but not limited to: online chat rooms, web conferring, private messaging systems used in social networking websites, etc. In addition to being a standalone system, the intelligent chat system can also be part of other personal or collaborative data managing systems. In one embodiment, the intelligent chat system is part of Zimbra® (registered trademark of VMware Inc. of Palo Alto, Calif.) Collaboration Suite.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for enhancing online chat experience, comprising:

establishing a chat session between a first participant and a second participant, the chat session being executed using a chat application that enables a plurality of messages to be transmitted between the first participant and the second participant, the messages being displayed in a chat window local to each participant;

initiating a chat assistant configured to execute as a background process on a computer, the chat assistant configured to monitor the plurality of messages;

monitoring, by the chat assistant, content in the plurality of messages transmitted between the first participant and the second participant;

parsing, by the chat assistant, text of an instant message transmitted from the first participant to the second participant;

recognizing a specified set of content in the instant message;

in response to recognizing the set of content, determining, based on one or more privacy rules specified by the first participant, whether the first participant of the chat session has identified the second participant of the chat session as being permitted to view additional information obtained by the chat assistant from a third party service by using profile information of the first participant and automatically obtaining, from a data source external with respect to the chat application, the additional information if the second participant has been identified by the first participant as being permitted to view the additional information; and if the first participant has identified the second participant as being permitted to view the additional information, presenting simultaneously to both the first participant and the second participant, the obtained additional information within the chat window along with the instant message transmitted from the first participant to the second participant by the chat assistant without requiring either the first participant or the second participant to request the additional information manually, otherwise if the first participant has not identified the second participant as being permitted to view the additional information, presenting the instant message within the chat window without the additional information.

2. The method of claim 1, wherein the data source includes at least one of:
   an email server;
   a calendar;
   an enterprise database; and
   Internet.

3. The method of claim 1, wherein the additional information includes one or more of:
   a map;
   an email;
   a date;
   a time;
   a calendar item; and
   a venue.

4. A non-transitory computer-readable storage medium storing instructions that when executed by a processor cause the processor to perform a set of operations comprising:
   establishing a chat session between a first participant and a second participant, the chat session being executed using a chat application that enables a plurality of messages to be transmitted between the first participant and the second participant, the messages being displayed in a chat window local to each participant;
   initiating a chat assistant configured to execute as a background process on a computer, the chat assistant configured to monitor the plurality of messages;
   monitoring, by the chat assistant, content in the plurality of messages transmitted between the first participant and the second participant;
   parsing, by the chat assistant, text of an instant message transmitted from the first participant to the second participant;
   recognizing a specified set of content in the instant message;
   in response to recognizing the set of content, determining, based on one or more privacy rules specified by the first participant, whether the first participant of the chat session has identified the second participant of the chat session as being permitted to view additional information obtained by the chat assistant from a third party service by using profile information of the first participant and automatically obtaining, from a data source external with respect to the chat application, the additional information if the second participant has been identified by the first participant as being permitted to view the additional information; and
   if the first participant has identified the second participant as being permitted to view the additional information, presenting simultaneously to both the first participant and the second participant, the obtained additional information within the chat window along with the instant message transmitted from the first participant to the second participant by the chat assistant without requiring either the first participant or the second participant to request the additional information manually, otherwise if the first participant has not identified the second participant as being permitted to view the additional information, presenting the instant message within the chat window without the additional information.

5. The storage medium of claim 4, wherein the data source includes at least one of:
   an email server;
   a calendar;
   an enterprise database; and
   Internet.

6. The storage medium of claim 4, wherein the additional information includes one or more of:
   a map;
   an email;
   a date;
   a time;
   a calendar item; and
   a venue.

7. A computer system, comprising: a processor;
   a memory coupled to the processor, the memory storing a sequence of instructions executed by the processor to:
      establish a chat session between a first participant and a second participant, the chat session being executed using a chat application that enables a plurality of messages to be transmitted between the first participant and the second participant, the messages being displayed in a chat window local to each participant;
      initiate a chat assistant configured to execute as a background process on computer system, the chat assistant configured to monitor the plurality of messages;
   monitor, by the chat assistant, content in the plurality of messages transmitted between the first participant and the second participant;
      parse, by the chat assistant, text of an instant message transmitted from the first participant to the second participant;
      recognize a specified set of content in the instant message;
      in response to recognizing the set of content, determine, based on one or more privacy rules specified by the first participant, whether the first participant of the chat session has identified the second participant of the chat session as being permitted to view additional information obtained by the chat assistant from a third party service by using profile information of the first participant and automatically obtain, from a data source external with respect to the chat application, the additional information if the second participant has been identified by the first participant as being permitted to view the additional information; and
      if the first participant has identified the second participant as being permitted to view the additional information, present simultaneously to both the first participant and the second participant, the obtained additional information within the chat window along with the instant message transmitted from the first participant to the second participant by the chat assistant without requiring either the first participant or the second participant to request the additional information manually, otherwise if the first participant has not identified the second participant as being permitted to view the additional information, present the instant message within the chat window without the additional information.

8. The computer system of claim 7, wherein the data source includes at least one of:
   an email server;
   a calendar;

an enterprise database; and
Internet.

9. The computer system of claim 7, wherein the additional information includes one or more of:
a map;
an email;
a date;
a time;
a calendar item; and
a venue.

10. The method of claim 1, further comprising: recognizing a question related to a home address of the first participant in the plurality of messages transmitted between the first participant and the second participant;
determining whether the first participant has previously authorized the second participant to know the home address of the first participant;
if the first participant has authorized the second participant to know the home address, contacting a mapping service by the chat assistant, retrieving a set of directions from the mapping service, and displaying the set of directions within the chat window.

11. The storage medium of claim 4, wherein the set of operations further comprises:
recognizing a question related to a home address of the first participant in the plurality of messages transmitted between the first participant and the second participant;
determining whether the first participant has previously authorized the second participant to know the home address of the first participant;
if the first participant has authorized the second participant to know the home address, contacting a mapping service by the chat assistant, retrieving a set of directions from the mapping service, and displaying the set of directions within the chat window.

12. The computer system of claim 7, the memory further comprising instructions executed by the processor to:
recognize a question related to a home address of the first participant in the plurality of messages transmitted between the first participant and the second participant;
determine whether the first participant has previously authorized the second participant to know the home address of the first participant;
if the first participant has authorized the second participant to know the home address, contact a mapping service by the chat assistant, retrieve a set of directions from the mapping service, and display the set of directions within the chat window.

13. The method of claim 1, further comprising:
detecting that the instant message of the first participant is referencing an email message; and
fetching the email message and presenting the content of the email message in the chat window along with the instant message to enable both the first participant and the second participant to view the content of the email message.

14. The storage medium of claim 4, wherein the set of operations further comprises:
detecting that the instant message of the first participant is referencing an email message; and
fetching the email message and presenting the content of the email message in the chat window along with the instant message to enable both the first participant and the second participant to view the content of the email message.

15. The computer system of claim 7, the memory further comprising instructions executed by the processor to:
detecting that the instant message of the first participant is referencing an email message; and
fetching the email message and presenting the content of the email message in the chat window along with the instant message to enable both the first participant and the second participant to view the content of the email message.

16. The method of claim 1, further comprising:
determining that the chat session includes a message related to scheduling a meeting between the first participant and the second participant;
accessing a calendar of the first participant and the second participant if the one or more rules permit accessing the calendar;
comparing the calendar of the first participant and the second participant and selecting one or more time slots in the calendar during which both the first participant and the second participant are available; and
displaying the selected one or more time slots in the chat window to both the first participant and the second participant of the chat session.

17. The method of claim 1, wherein presenting simultaneously to both the first participant and the second participant, the obtained additional information within the chat window along with the instant message further comprises:
displaying only a portion of the obtained additional information in the chat window local to the second participant while displaying all of the obtained additional information in the chat window local to the first participant;
wherein the chat assistant displays different information locally to the first participant from the information displayed locally to the second participant.

18. The storage medium of claim 4, wherein the set of operations further comprises:
determining that the chat session includes a message related to scheduling a meeting between the first participant and the second participant;
accessing a calendar of the first participant and the second participant if the one or more rules permit accessing the calendar;
comparing the calendar of the first participant and the second participant and selecting one or more time slots in the calendar during which both the first participant and the second participant are available; and
displaying the selected one or more time slots in the chat window to both the first participant and the second participant of the chat session.

19. The storage medium of claim 4, wherein presenting simultaneously to both the first participant and the second participant, the obtained additional information within the chat window along with the instant message further comprises:
displaying only a portion of the obtained additional information in the chat window local to the second participant while displaying all of the obtained additional information in the chat window local to the first participant;
wherein the chat assistant displays different information locally to the first participant from the information displayed locally to the second participant.

20. The computer system of claim 7, the memory further comprising instructions executed by the processor to:
determine that the chat session includes a message related to scheduling a meeting between the first participant and the second participant;
access a calendar of the first participant and the second participant if the one or more rules permit accessing the calendar;

compare the calendar of the first participant and the second participant and select one or more time slots in the calendar during which both the first participant and the second participant are available; and display the selected one or more time slots in the chat window to both the first participant and the second participant of the chat session.

21. The computer system of claim 7, wherein presenting simultaneously to both the first participant and the second participant, the obtained additional information within the chat window along with the instant message further comprises:

displaying only a portion of the obtained additional information in the chat window local to the second participant while displaying all of the obtained additional information in the chat window local to the first participant;

wherein the chat assistant displays different information locally to the first participant from the information displayed locally to the second participant.

* * * * *